Feb. 1, 1949. O. E. ANDRUS 2,460,407
WASHER FOR GARDEN HOSE COUPLINGS
Filed Dec. 10, 1945
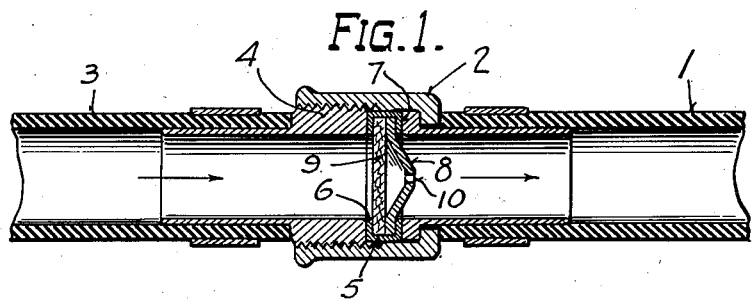
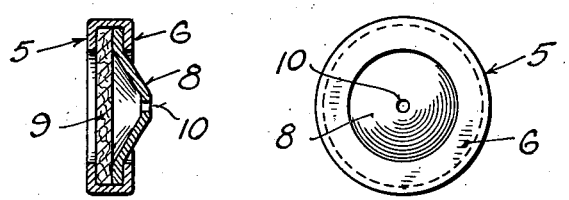
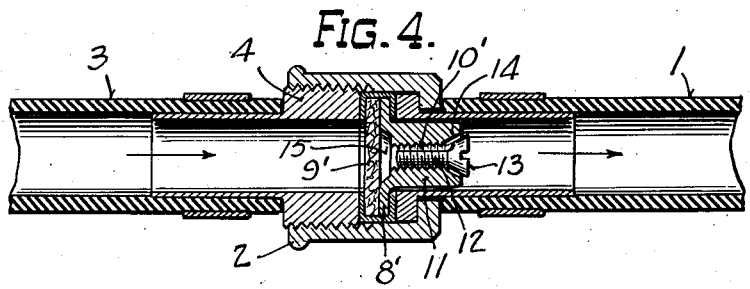
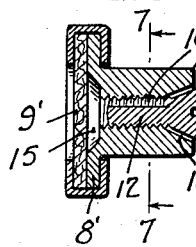 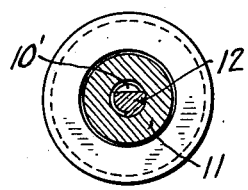 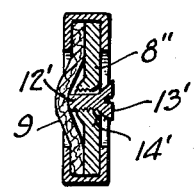
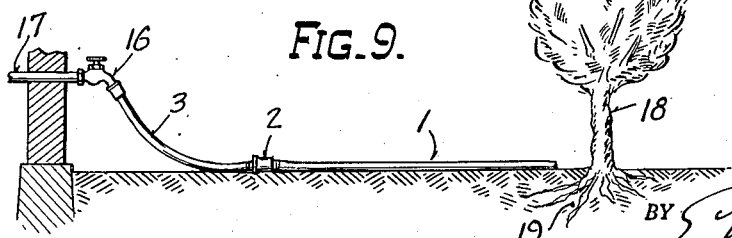
Orrin E. Andrus
INVENTOR.
BY
ATTORNEY.

Patented Feb. 1, 1949

2,460,407

UNITED STATES PATENT OFFICE 2,460,407

WASHER FOR GARDEN HOSE COUPLINGS

Orrin E. Andrus, Altadena, Calif.

Application December 10, 1945, Serial No. 633,961

6 Claims. (Cl. 138—46)

This invention relates to a washer for garden hose coupling.

The principal object of the invention is to provide a washer for garden hose couplings that serves as a control for the flow of water through the hose so as to predetermine the flow of water from the hose in some relation to the rate of diffusion of the water into the soil, without requiring expensive nozzles or valves for this purpose.

Another object of the invention is to provide a washer that has an adjustable restricted passage therethrough capable of controlling the flow of water in the hose.

Another object is to prevent clogging of the flow control means in the washer by dirt in the water.

Another object is to provide a washer that seals a hose coupling and also controls the flow of water through the hose.

Other objects and advantages will appear in the description of the invention as illustrated in the accompanying drawings.

In the drawings:

Figure 1 is an axial section through a hose and its coupling showing a washer in place;

Fig. 2 is an enlarged axial section through the washer of Fig. 1;

Fig. 3 is a front view of the washer of Fig. 1;

Fig. 4 is a view similar to Fig. 1 showing an adjustable washer;

Fig. 5 is an enlarged axial section through the washer of Fig. 4;

Fig. 6 is a front view of the washer of Fig. 4;

Fig. 7 is a transverse section taken on line 7—7 of Fig. 5 through the stem of the washer of Fig. 4;

Fig. 8 is a view similar to Fig. 5 of another construction for an adjustable washer; and Fig. 9 is a schematic diagram of a garden hose system in use for watering shrubs and plants and employing the washer of the invention.

The hose 1 has an internally threaded female coupling member 2 secured to its end. The hose 3 has a corresponding externally threaded male coupling member 4 secured to its end and adapted to be threaded into the member 2 to fasten the two hoses 1 and 3 together.

A disc-like washer 5 having a circular rim 6 of rubber, soft metal or the like is disposed to seat between the end of member 4 and an internal shoulder 7 in member 2 to seal the coupling against leakage therefrom.

In carrying out the present invention, instead of constructing the washer 5 solely of a solid circular rubber ring, the rim 6 is preferably constructed of U-shaped cross section and, as shown, serves to confine a metal, rubber or fiber disc 8 and an adjacent filter member 9 and secure the same together. A separate rim 6 may be provided for disc 8 and another for filter 9 and function as the seal therefor and as a spacer between them. Where the disc 8 is of rubber or of the same material as rim 6, the disc may be formed integral with the rim and of substantially the same thickness.

The disc 8 has one or more small holes or slits constituting orifices 10 preferably near the center for the passage of water therethrough. Where a single orifice 10 is employed at the center of the disc, the size of the orifice determines the amount of water flow, and washers having different size orifices may be supplied for selection in use so that the flow of water may be regulated in some relation to the water pressure in the system and the diffusion rate of the water in the ground.

The filter 9 is of suitable metal screening or organic material in the form of cloth or matted fibers and preferably has its outer edge confined in the rim 6 and its body spaced from disc 8. The filter may be raised toward one side to space the face of the filter area from the disc 8 so as to provide substantial area for filtering without undesirable restriction of the flow to the orifice.

In positioning the washer 5 in the coupling, the filter 9 should be disposed on the side of the disc 8 from which the water enters to pass through the orifice 10.

The washer 5 may provide for adjustment of the orifice 10. For this purpose the construction illustrated in Figs. 4, 5, 6 and 7 is simple and satisfactory.

The disc 8' has a central tubular projection 11 with a tapped hole therein for receiving and adjusting screw 12. The head 13 of screw 12 has a long conical shoulder fitting a corresponding complementary recess 14 in the outlet end of the projection 11. One side of the threaded stem of screw 12 is filed away to provide a channel 10' for conducting water to the orifice or restricted outlet space between the head 13 and the corresponding recess in projection 11.

A filter disc 9' is disposed flat against disc 8' on the inlet side and the disc 8' is recessed at 15 around the hole therein to space the filter from the disc and provide for the desired filter area.

The size of orifice 10' determines the maximum water flow when screw 12 is in place, and the position of the head 13 in projection 11 determines the minimum water flow through the disc.

In the construction of Fig. 8 the tubular projection 11 is eliminated and the disc 8'' is formed conically to one side about a central tapped hole therein for receiving a small screw 12' with a conical head 13' fitting into the recess 14' in the side of the disc. In this construction the end of screw 12' may protrude on the inlet side of the disc 8'' and serve to maintain the filter 9 spaced from the disc.

The washer 5 is particularly useful in the watering of lawn shrubs and trees in arid and semi-arid regions where spray devices are generally unsatisfactory due to washing away of the soil and of fertilizer and to the personal attention required.

In Fig. 9 the washer 5 is shown in a coupling between the hose 1 and hose 3, and hose 3 is connected to the faucet 16 in the water supply pipe 17. The outer end of hose 1 is positioned on top of the ground beneath a shrub 18. The faucet 16 is preferably wide open and washer 5 restricts the floor of water to shrub 18 to a small amount capable of soaking into the ground and diffusing around the roots 19 of the shrub without undesirable washing away of the more fertile top soil or of fertilizer.

The washer is of simple and low-cost construction and it provides an easy means for regulating the flow of water for irrigation purposes. It may be employed either in a coupling between two sections of hose or in a coupling between a hose and a pipe or faucet.

The invention may have various embodiments within the scope of the accompanying claims.

I claim:

1. A washer or the like for garden hose connections, comprising a disc adapted to be confined in the connection transversely of the hose and having an orifice therein controlling the flow of water therethrough, means carried by the disc to adjust the size of the passage through the orifice for regulation of the flow of water, a filter member disposed on the inlet side of said disc, and a resilient circular rim member confining the corresponding adjacent edge portions of said disc and filter to hold the same in place and seal the connection against leakage.

2. A washer or the like for garden hose connections, comprising a disc adapted to be confined in the connection transversely of the hose and having an orifice therein controlling the flow of water therethrough, a filter member disposed on the inlet side of said disc, and a resilient circular rim member confining the corresponding adjacent edge portions of said disc and filter to hold the same in place, the central portion of said filter member and disc being spaced apart to provide a filter area substantially larger than the orifice in the disc.

3. A washer for sealing garden hose connections, comprising a disc having a restricted passage therethrough governing the flow of water through the hose, said disc having a tubular projection to one side thereof about said restricted passage, a threaded member in said projection and providing an adjustment for said passage, and a filter on the side of said disc opposite said projection, said disc having a recess in its side spacing the filter therefrom and providing a substantial filter area around said passage.

4. A washer or the like for garden hose connections, comprising a disc adapted to be confined in the connection transversely of the hose and having an orifice therein controlling the flow of water therethrough, a filter member disposed in spaced relation to said orifice on the inlet side thereof with the margin of the filter disposed adjacent the margin of said disc, and a resilient circular rim member confining the corresponding adjacent edge portions of said disc and filter to hold the same in place and seal the connection against leakage.

5. A washer or the like for threaded garden hose couplings, comprising a conical stamped metal disc having a central orifice therethrough and an outer marginal edge flange normal to the axis thereof, a filter disc disposed adjacent said flange and extending across the base of the conical disc in spaced relation to said orifice, and means securing the adjacent marginal edge portions of said disc and filter together to constitute a washer unit adapted to be confined between the threaded members of a coupling and to seal the coupling against leakage.

6. A sealing washer for a threaded hose connection, comprising a disc having a central orifice and having a resilient marginal edge portion extending in a plane normal to the axis of the disc and adapted to be clamped between threaded members of the connection to secure the disc in place, and means carried by the disc to prevent clogging or said orifice in use.

ORRIN E. ANDRUS.

REFERENCES CITED

The following references are of record in the file of this patent:

UNITED STATES PATENTS

| Number | Name | Date |
|---|---|---|
| 739,346 | Rettich | Sept. 22, 1903 |
| 1,657,663 | Devereux | Jan. 31, 1928 |
| 1,694,838 | Bayha | Dec. 11, 1928 |
| 1,731,404 | Wetherill | Oct. 5, 1931 |
| 1,812,916 | Zerk | July 7, 1931 |
| 1,986,600 | Pigott | Jan. 1, 1935 |